United States Patent
Watson

(10) Patent No.: US 7,225,978 B2
(45) Date of Patent: Jun. 5, 2007

(54) TRANSACTION FORMS AND METHOD FOR MAKING

(75) Inventor: Felicia A. Watson, Omaha, NE (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 11/153,867

(22) Filed: Jun. 14, 2005

(65) Prior Publication Data

US 2006/0278696 A1    Dec. 14, 2006

(51) Int. Cl.
  *G06K 5/00* (2006.01)
  *B42D 15/00* (2006.01)
  *B42D 15/10* (2006.01)

(52) U.S. Cl. .......................... 235/380; 283/72
(58) Field of Classification Search ................ 235/380; 283/72
  See application file for complete search history.

(56) References Cited

U.S. PATENT DOCUMENTS

| | | | | |
|---|---|---|---|---|
| 2,035,768 A | * | 3/1936 | Sherman et al. ............. | 427/152 |
| 3,222,086 A | * | 12/1965 | Gosselin ...................... | 462/56 |
| 3,625,547 A | * | 12/1971 | Burke .......................... | 462/56 |
| 4,027,589 A | * | 6/1977 | Timm .......................... | 101/269 |
| 4,045,053 A | * | 8/1977 | Carriere ...................... | 462/55 |
| 4,116,469 A | * | 9/1978 | Harriman et al. ............. | 462/56 |
| 4,179,139 A | * | 12/1979 | Savar et al. .................. | 462/53 |
| 4,394,038 A | * | 7/1983 | Klein ........................... | 462/55 |
| 4,403,793 A | * | 9/1983 | McCormick et al. ....... | 283/105 |
| 4,512,595 A | * | 4/1985 | Breen .......................... | 283/70 |
| 4,611,826 A | * | 9/1986 | Breen .......................... | 462/55 |
| 4,614,363 A | * | 9/1986 | Breen .......................... | 462/55 |
| 4,643,453 A | * | 2/1987 | Shapiro et al. ............... | 283/73 |
| 4,687,228 A | * | 8/1987 | Van Malderghem et al. .. | 462/18 |
| 4,730,848 A | * | 3/1988 | McCormick .................. | 462/55 |
| 4,741,558 A | * | 5/1988 | Louis ........................... | 462/55 |
| 4,903,989 A | * | 2/1990 | McCormick .................. | 462/69 |
| 4,947,027 A | * | 8/1990 | Golightly ..................... | 235/448 |
| 5,047,384 A | * | 9/1991 | McCormick ................. | 503/226 |
| 5,088,961 A | * | 2/1992 | Sprain .......................... | 462/2 |
| 5,088,962 A | * | 2/1992 | McCartney .................. | 462/18 |
| RE34,096 E | * | 10/1992 | Golightly ..................... | 235/380 |
| 5,153,168 A | * | 10/1992 | Uhlemayr et al. ........... | 503/206 |
| 5,209,698 A | * | 5/1993 | Dolan ........................... | 462/17 |
| 5,422,468 A | * | 6/1995 | Abecassis .................... | 235/380 |
| 6,138,569 A | * | 10/2000 | McCormick ................. | 101/483 |
| 2006/0196371 A1 | * | 9/2006 | Naoumis ...................... | 101/22 |
| 2006/0278696 A1 | * | 12/2006 | Watson ........................ | 235/380 |

FOREIGN PATENT DOCUMENTS

WO    WO 87/04981    *    2/1987

* cited by examiner

*Primary Examiner*—Daniel Walsh
(74) *Attorney, Agent, or Firm*—Townsend and Townsend and Crew LLP

(57) ABSTRACT

Transaction form systems and methods that include secure customer slips for use with traditional manual credit card imprinting techniques are provided. A transaction form system can include a cardholder slip, an accepter slip, and a duplication arrangement. The duplication arrangement can be configured to produce a complete image of a presentation instrument identifier onto the accepter slip and to produce a partial image of the presentation instrument identifier onto the cardholder slip.

20 Claims, 2 Drawing Sheets

TRANSACTION FORMS AND METHOD FOR MAKING

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates generally to the field of transaction form systems and methods, and more particularly, to systems and methods for providing secure customer slips for use with traditional manual credit card imprinting techniques.

Credit and charge card fraud is an increasing problem in society. Such fraud costs businesses billions of dollars each year, and costs individuals unwanted time and inconvenience in getting their credit cleared. Charge card companies have developed a variety of methods to make charge card transactions more secure. Some include a photograph of the cardholder to assist a merchant in making a positive identification of the user. Others may include holograms, secret imprints, or hidden images, thereby preventing forgers from making new cards with a stolen cardholder account number.

Despite these improvements, there remains ample opportunity for fraudulent individuals to victimize innocent credit card holders. For example, card fraud can be perpetrated when a thief obtains a customer's discarded receipts or carbons, and then uses the account number to illegally obtain goods, services, or cash. What is more, charge card account information from lost or stolen customer receipts can be used as a source of personal information for those who would commit identity theft. Standard transaction form systems and method may not provide sufficient protection against the security vulnerabilities discussed above. For example, forms that are currently used with manual imprinters provide customer copies that include a complete image of the customer's account number.

In light of the above, it would be desirable to provide improved transaction form systems and methods, particularly for use with manual imprinters such as rolling imprinters, stamp imprinters, including flatbed and pump-handle models, and the like.

BRIEF SUMMARY OF THE INVENTION

The present invention provides improved transaction form methods and systems that can be used with charge cards. These systems and methods may be particularly useful for preventing unwanted charge card theft. Advantageously, these approaches generally provide a transaction form that can be used with a manual imprinter that produces a customer slip which contains only a partial image of the customer's account number. The present invention can be used in a wide variety of situations, including, but not limited to, credit card transactions, debit card transactions, healthcare card transactions, petroleum card transactions, and the like. The present invention provides transaction forms that offer improved security features for addressing issues that have heretofore been particularly difficult and/or impossible to address with conventional techniques.

The present invention also provides systems and methods for protecting merchants from chargebacks, which can be a common problem for merchants who process cards such as credit and charge cards. This situation can occur when a customer disputes a credit card invoice. If, for example, the cardholder account number is written on the transaction form by the merchant, there may be no concrete proof that the credit card or cardholder were present at the time of transaction. Unfortunately, even if the transaction was valid, the disputed amount may be charged back to the merchant, who is not paid for the purchase. The present invention provides protection against chargebacks because it can produce an accepter slip that retains a complete image of a cardholder account number, as it is imprinted from a customer's card, thereby providing the proof that may be required by a credit card issuer during a chargeback investigation. The merchant can be reimbursed by providing such an imprint. At the same time, the present invention provides security for the cardholder by providing a cardholder slip that contains a partial image of the cardholder account number.

In a first aspect, the present invention provides a transaction form system. The system can include a cardholder slip, an accepter slip, and a duplication arrangement configured to produce a complete image of a presentation instrument identifier onto the accepter slip and to produce a partial image of the presentation instrument identifier onto the cardholder slip. The duplication arrangement can be configured to transfer a complete image of the presentation instrument identifier onto the cardholder slip, the cardholder slip further comprising a camouflage medium that renders a portion of the complete image as unreadable. In some cases, the cardholder slip includes an aperture, configured for alignment with part of the presentation instrument identifier. The cardholder slip can include a masking medium that prevents the transfer of the complete image of the presentation instrument identifier onto the cardholder slip. The duplication arrangement can be configured to transfer a complete image of the presentation instrument identifier onto the cardholder slip. Relatedly, the duplication arrangement can include a removable strip configured for alignment with part of the presentation instrument identifier.

In some aspects, the duplication arrangement includes a suppression region such that when the system is processed in an imprinter with a presentation instrument, the suppression region does not produce any image onto the cardholder slip. The suppression region can include a rigid blocking member that cannot be deformed when the system is processed in the imprinter. In related aspects, the suppression region may contain no duplication medium. The presentation instrument identifier can include a 16 digit cardholder account number, and the complete image of the presentation instrument identifier can include the 16 digit cardholder account number. Relatedly, the presentation instrument identifier can include a 16 digit cardholder account number, and the partial image of the presentation instrument can include less than 16 digits of the 16 digit cardholder account number. Further, the presentation instrument identifier can include a 16 digit cardholder account number, and the partial image of the presentation instrument can consist of the first 12 digits of the 16 digit cardholder account number. In some cases, the presentation instrument identifier includes embossed characters. In a related aspect, the system also includes an issuer slip, where the duplication arrangement is configured to produce a complete image of the presentation instrument identifier onto the issuer slip.

In a second aspect, the present invention provides a method of processing a presentation instrument during a transaction. The method can include accepting a presentation instrument from a cardholder and placing the presentation instrument in an imprinter along with a transaction form. The transaction form can include an accepter slip, a cardholder slip, and a duplication arrangement. The method may also include processing the presentation instrument against a transaction form with the imprinter to produce a complete image of a presentation instrument identifier onto the accepter slip and to produce an incomplete image of the presentation instrument identifier onto the cardholder slip. In a related aspect, the method the processing step may include transferring a complete image of the presentation instrument identifier onto the cardholder slip, where a portion of the transferred image is transferred onto a camouflage medium present on the cardholder slip.

The cardholder slip may include an aperture, configured for alignment with a portion of the presentation instrument identifier. In some aspects, the processing step can include preventing the transfer of a portion of the image of the presentation instrument identifier onto the cardholders slip via a masking medium. In some aspects, the processing step can include transferring a portion of the image of the presentation instrument identifier onto a removable strip of the cardholder slip. The duplication arrangement can include a suppression region such that when the system is processed in an imprinter with a presentation instrument, the suppression region does not produce any image onto the cardholder slip. In some cases, the suppression region includes a rigid blocking member that cannot be deformed when the system is processed in the imprinter. In some cases, the suppression region contains no duplication medium. In a related aspect, the presentation instrument identifier includes a 16 digit cardholder account number, and the complete image of the presentation instrument identifier comprises the 16 digit cardholder account number. In another related aspect, the presentation instrument identifier includes a 16 digit cardholder account number, and the partial image of the presentation instrument consists of less than 16 digits of the 16 digit cardholder account number. In yet another related aspect, the presentation instrument identifier includes a 16 digit cardholder account number, and the partial image of the presentation instrument consists of the first 12 digits of the 16 digit cardholder account number. The presentation instrument identifier can include embossed characters. The transaction form can include an issuer slip, and the processing step can include producing a complete image of the presentation instrument identifier onto the issuer slip.

In a third aspect, the present invention provides a method of making a transaction form system as described herein. For example, the method may include attaching a cardholder slip with an accepter slip and a duplication arrangement, where the duplication arrangement can be configured to produce a complete image of a presentation instrument identifier onto the accepter slip and to produce a partial image of the presentation instrument identifier onto the cardholder slip.

For a fuller understanding of the nature and advantages of the present invention, reference should be had to the ensuing detailed description taken in conjunction with the accompanying drawings.

DETAILED DESCRIPTION OF THE INVENTION

Despite the advent of electronic credit card processing terminals, there remains a strong demand for manual imprinters that can be used with financial transaction forms. For example, in the case of a merchant who takes only a few cards per day in a non-rushed environment, it may be more economically feasible to use a manual imprinter as opposed to an electronic sales terminal. Relatedly, even merchants who typically use an electronic sales terminal will find use for a manual imprinter on certain occasions such as for backup when electronic swipe terminals fail due to high volume traffic at authorization centers, downed phone lines, or power outages. Imprinters are also useful for chargeback prevention. Many financial institutions, merchant service providers, travel agencies, and mobile business such as food caterers, taxi-cabs, tow-trucks, and duty free carts find manual imprinters either very useful or indispensable. Accordingly, what is needed are transaction form systems and methods for use with manual imprinters that can provide improved security features.

Figure 1:
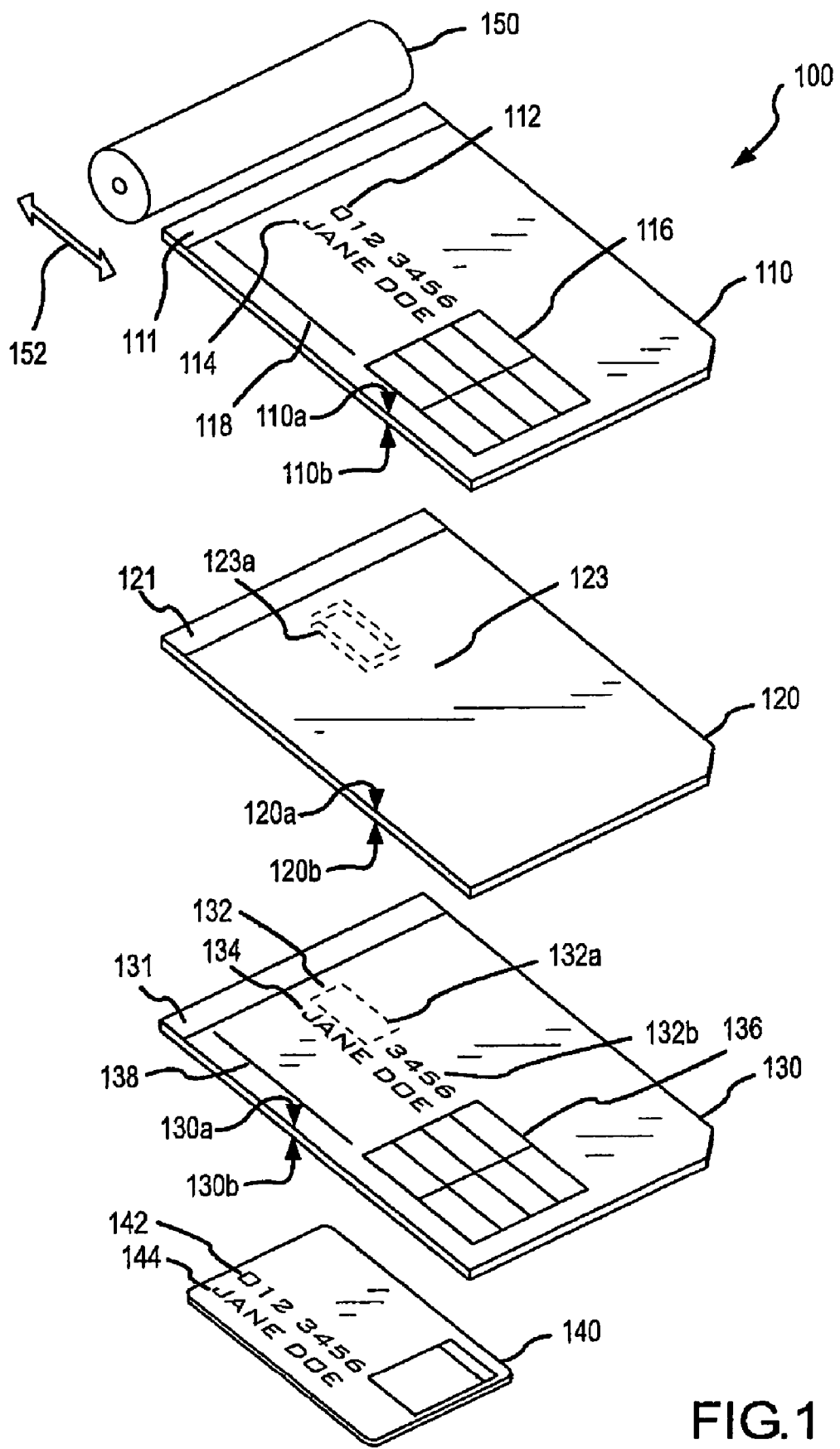
FIG. 1 shows a transaction form system according to one embodiment of the present invention.

Turning now to the drawings, FIG. 1 illustrates a transaction form system 100 according to one embodiment of the present invention. System 100 includes an accepter slip 110, a cardholder slip 130, and a duplication arrangement 120. In a typical processing method, an accepter, such as a merchant, will accept a customer card 140 from the cardholder, and place card 140 into a manual imprinter. The merchant will then place transaction form 100 over card 140, and apply pressure to system 100 and card 140 via a roller 150, by moving roller 150 back and forth across form system 100 as indicated by arrow 152. Accepter slip 110, duplication arrangement 120, and cardholder slip 130 may include an accepter slip attachment end 111, a duplication attachment end 121, and a cardholder slip attachment end 131, respectively, whereby the attachment ends are coupled together via an adhesive or other suitable means. Transaction forms containing similar features are discussed in U.S. Pat. No. 4,403,793 to McCormick et al., U.S. Pat. No. 4,687,228 to Van Malderghem et al., U.S. Pat. No. 4,730,848 to McCormick, U.S. Pat. No. 4,903,989 to McCormick, and U.S. Pat. No. 5,088,962 to McCartney, the disclosures of which are herein incorporated by reference.

The merchant can fill in a table 116 by writing in the date of the charge, a description and amount of the goods or services, and the tax amount. The customer can also write a tip amount in table 116, and can sign a signature line 118. The merchant then returns card 140 to the cardholder, and provides cardholder with cardholder slip 130. In some situations, a card may not be available, and the merchant can simply write in the cardholder's account number and name by hand with a ballpoint pen on a front side 110a of accepter slip 110. In some cases, any pressure-inducing instrument may be used, depending what type of duplication arrangement is included in the system. The present invention is well suited for such situations, and in fact many of the benefits and security features discussed herein with regard to manual imprinters are equally applicable to situations where a cardholder's account number is manually written onto system 100. It is also appreciated that the present invention can be used in any of a variety of financial transactions, including refund transactions, sales transactions, and the like.

When pressure is applied via roller 150, the embossed cardholder name characters 144 and account number characters 142, in cooperation with duplication arrangement 120, cause images to form on accepter slip 110 and cardholder slip 130. In particular, an image of a presentation instrument identifier such as a cardholder account number 142 can be formed at location 112 of accepter slip 110 and at location 132 of cardholder slip 130. Similarly, an image of a presentation instrument identifier such as a cardholder name 144 can be formed at location 114 of accepter slip 114 and at location 134 of cardholder slip. In some embodiments, duplication arrangement 120 will include a layer of carbon duplication medium on a front side of the arrangement 120a, and a layer of carbon duplication medium on a back side of the arrangement 120b. In this way, duplication medium can be transferred from arrangement front side 120a to a back side of accepter slip 110b, and from arrangement back side 120b to a front side of customer slip 130a. The duplication medium that is transferred corresponds to the embossed characters as noted above. Typically, accepter slip 110 is manufactured from a paper having some degree of transparency, so that carbon duplication medium that is transferred from carbon duplication arrangement front side 120a onto the back of accepter slip 110b is visible when viewing front side of the accepter slip 110a. It will be appreciated that in addition to carbon duplication medium, any of a variety of other suitable duplication mediums may be used. Although the embodiment shown in FIG. 1 describes card 240 as having a seven digit cardholder account number 242, it is appreciated that systems and methods according to the present invention can be adapted for use with cards having various presentation instrument identifiers, such as cardholder account numbers of any length and any combination of digits, letters, or other identifying characters or indicia.

As noted above, cardholder slips that contain a complete imprint of cardholder account number 142 and cardholder name 144 are often misused, leaving the cardholder a victim of charge card theft or identity theft. Accordingly, the present invention provides systems that can be configured to form a partial image of cardholder account number onto cardholder slip 130, for example at location 132b. What is more, transaction forms according to the present invention can be configured to provide cardholder slips that comply with any federal and state regulations, card issuer terms, conditions set forth by purchasing and marketing coalitions such as VISA®, and the like. For example, a truncation requirement may mandate that only the last four numbers of a cardholder account number shall be produced on cardholder slip 130.

The present invention contemplates a variety of different configurations for providing secure cardholder slips. For example, duplication arrangement 120 can be adapted to transfer a complete image of cardholder account number 142 onto cardholder slip 130 at locations 132a and 132b. Cardholder slip 130 can include a camouflage medium at location 132a upon which the selected digits of the account number 142 are transferred to the slip. The camouflage medium, which may be a black box or other pattern, effectively makes it difficult or impossible to read the characters formed by carbon medium that has been transferred onto the camouflage medium. For example, the camouflage medium may provide little or no contrast with the transferred duplication medium. The remaining digits of the account number 142 can be seen at location 132b of cardholder slip 130. Thus, only a partial image of cardholder account number 142 is produced on cardholder slip 130, at location 132b.

In some embodiments, cardholder slip 130 can include a masking medium at location 132a, wherein the masking medium prevents the transfer of carbon duplication medium from back side of duplication arrangement 120b onto front side of cardholder slip 130a, for example at location 132a. In yet another embodiment, cardholders slip 130 can include a removable strip at location 132a. When an image of cardholder account number 142 is produced on cardholder slip 130 at locations 132a and 132b, the merchant, for example, can remove the strip from location 132a. Thus, only a partial image of cardholder account number 142 is produced on cardholder slip 130, at location 132b. The removable strip may be affixed to cardholders slip 130 in a variety of ways. For example, removable strip may include an adhesive backing by which it is removably attached with slip 130. In some embodiments, cardholder slip 130 may include a perforated boundary defining location 132a, such that removal of the strip, which may be integral with slip 130, results in an aperture in slip 130 at location 132a.

It will be appreciated that the positions of accepter slip 110 and cardholder slip 130 may be reversed from the positions shown in FIG. 1, such that cardholders slip 130 is disposed on top of accepter slip 110 and is manufactured from a somewhat transparent paper or material. In such cases, system 100 may include a suppression element, which prevents the transfer of duplication medium from front side of duplication arrangement 120a to back side of cardholder slip 130b. For example, suppression element may include an overlay disposed at location 123a on the front side of duplication arrangement 120a, wherein duplication medium is transferred onto the back side of overlay, and not onto back side of cardholder slip 130b. Thus, when card 140 and system 100 are processed in a manual imprinter only a partial image of cardholder account number 142 is produced on cardholder slip 130, at location 132b.

In related embodiments where cardholder slip 130 is above accepter slip 110, a suppression element of duplication arrangement 120 can include a one-sided duplicating configuration at location 123a, where the back side of duplication arrangement 120b includes a layer of carbon duplication medium and the front side of duplication arrangement 120a does not include a layer of carbon duplication medium. In this way, duplication medium can be transferred from location 123a of arrangement back side 120b to front side of accepter slip 110a, but no duplication medium is transferred onto back side of cardholder slip 130b at location 132a. Thus, only a partial image of cardholder account number 142 is produced on cardholder slip 130, at location 132b. A similar configuration can be constructed when accepter slip 110 is on top of cardholders slip 130, as shown in FIG. 1.

Although some of the systems described herein relate to situations where a partial image of cardholders account number is produced on cardholder slip 130, the present invention contemplates other situations that include similar features. For example, the present invention can include systems where a partial image of cardholder name 144 or another card indicia is produced on cardholder slip 130, and can further include systems where no image of certain indicia is produced on cardholder slip. For example, in some embodiments, a processed cardholder slip will contain no image of a card expiration date, a cardholder name, or possibly a cardholder signature. Relatedly, the systems may be constructed such that a partial image of cardholder account number, cardholder name, or another card indicia is produced on other slips of the systems, such as an accepter slip or an issuer slip.

Figure 2:
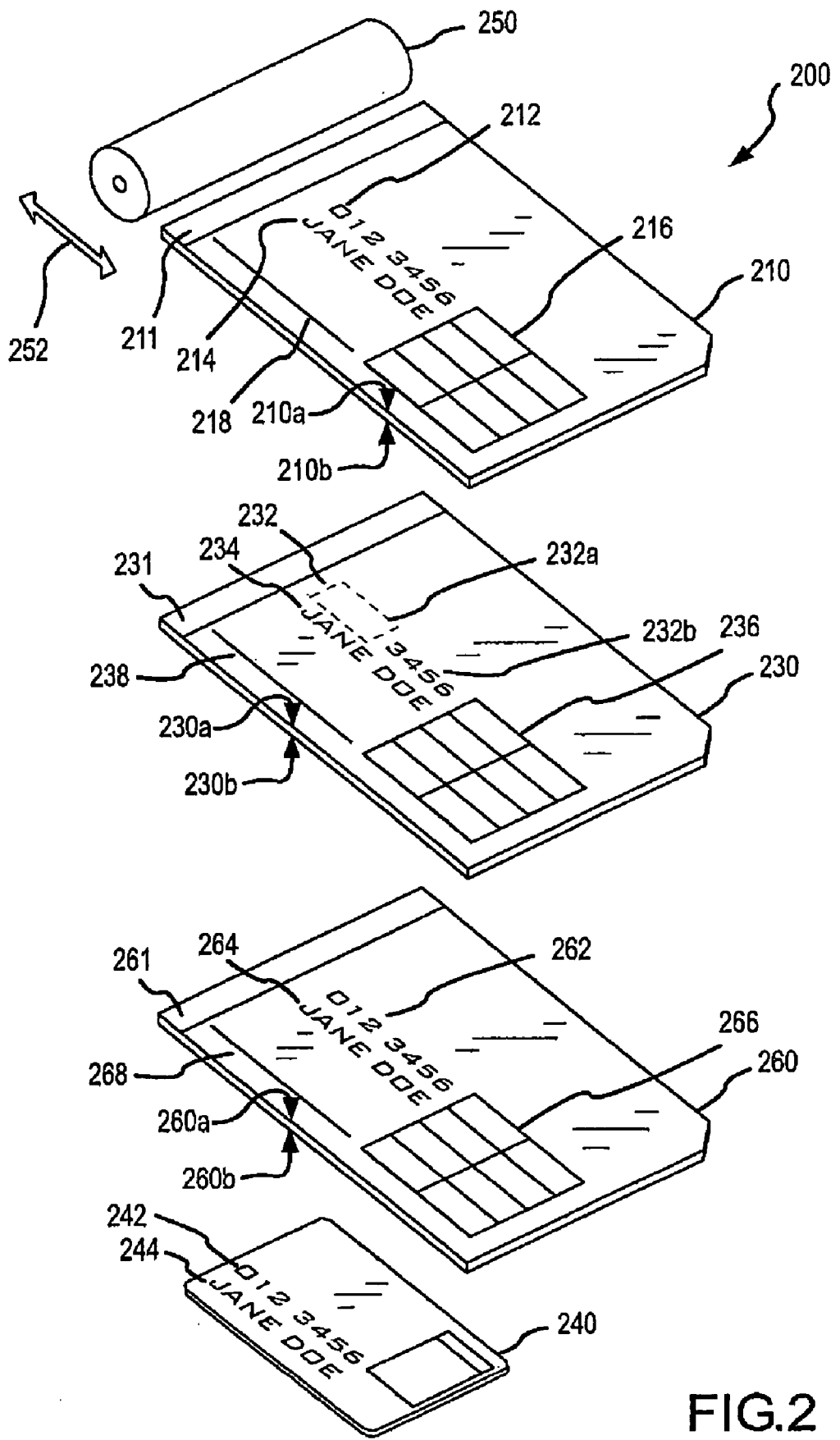
FIG. 2 shows a transaction form system according to one embodiment of the present invention.

FIG. 2 illustrates a transaction form system 200 according to one embodiment of the present invention. System 200 includes an accepter slip 210, a cardholder slip 230, an issuer slip 260 (e.g. for an issuer bank, a credit card company, or other financial institution) and a duplication arrangement. Accepter slip 210, cardholder slip 230, and issuer slip 160 may include an accepter slip attachment end 211, a cardholder slip attachment end 231, and an issuer slip attachment end 261, respectively, whereby the attachment ends are coupled together via an adhesive or other suitable means. Each of the slips may also be readily detachable from their respective attachment means, for example, by a perforation. In the embodiment shown here, the duplication arrangement is not separate from the other slips as in the embodiment depicted in FIG. 1, but instead may be in some fashion integral with one or more of the slips. For example, a back side of cardholder slip 230b may include a carbon duplication medium, such that when system 200 is processed with a card 240 in a manual imprinter by moving roller 250 in a back and forth direction as indicated by arrow 252, carbon duplication medium is transferred from the back side 230b onto a front side of issuer slip 260a to form an image of cardholder account number 242 at location 262, and an image of cardholder name 244 at location 264.

Similarly, a back side of accepter slip 210b may include a carbon duplication medium, such that when system 200 is processed with card 240, carbon duplication medium is transferred from the back side 210b onto a front side of cardholder slip 230a to form a partial image of cardholder account number 242 at location 232b, and an image of cardholder name 244 at location 264.

In some embodiments, the duplication arrangement, which can include a layer of duplication medium on back side of accepter slip 210b, can be adapted to transfer a complete image of cardholder account number 242 onto cardholder slip 230 at locations 232a and 232b. Cardholder slip 230 can include a camouflage medium at location 232a upon which the selected digits of the account number 242 are transferred to the slip. The camouflage medium, which may be a black box or other pattern, effectively makes it difficult or impossible to read the characters formed by carbon medium that has been transferred onto the camouflage medium. For example, the camouflage medium may provide little or no contrast with the transferred duplication medium. The remaining digits of the account number 242 can be seen at location 232b of cardholder slip 230. Thus, only a partial image of cardholder account number 242 is produced on cardholder slip 230, at location 232b.

In some embodiments, cardholder slip 230 can include a masking medium at location 232a, wherein the masking medium prevents the transfer of carbon duplication medium from back side of accepter slip 210b onto front side of cardholder slip 230a, for example at location 232a. In yet another embodiment, cardholders slip 230 can include a removable strip at location 232a. Thus, when an image of cardholder account number 242 is produced on cardholder slip 230 at locations 232a and 232b, the merchant, for example, can remove the strip from location 232a. Thus, only a partial image of cardholder account number 242 is produced on cardholder slip 230, at location 232b.

System 200 may include a suppression element, which prevents the transfer of duplication medium from back side of accepter slip 210b to portions of front side of cardholder slip 230a. For example, suppression element may include an overlay disposed on back side of accepter slip 210b, beneath the layer of duplication medium. The position of the overlay can correspond to selected digits of cardholder account number. When system 200 is processed with card 240 in a manual imprinter, duplication medium is transferred from back side of accepter slip 210b onto the front side of overlay, and not onto front side of cardholder slip 230a (e.g. at location 232a). Thus, only a partial image of cardholder account number 242 is produced on cardholder slip 230, at location 232b.

In related embodiments, the back side of accepter slip 210b has an area that is devoid of duplication medium, and this area corresponds to selected portions of cardholder account number 242. For example, in the case of a sixteen digit cardholder account number, back side of accepter slip 210b can include a nonduplication region that corresponds to the first twelve digits of the cardholder account number, such that when system 200 is processed in a manual imprinter, the duplication medium that is transferred from back side of accepter slip 210b corresponds only to the final four digits of cardholder account number. Thus, only a partial image of cardholder account number 142 is produced on cardholder slip 230, at location 232b. There is no duplication medium transferred to location 232a.

In addition to duplication arrangements where a duplication medium is transferred from one element onto another element, the present invention also encompasses duplication arrangements that utilize what is commonly known as "carbonless" technology. For example, a single slip may include colorless, chemically reactive dyes which produce a visible image when subjected to pressure. In one embodiment, a carbonless dye system includes a first colorless reactive dye and a second agent that initiates a chemical reaction to change the colorless dye into a visible dye. In some cases, the back of one slip or element is coated with a colorless reactive dye, and the front of the immediately adjacent slip is coated with a visualizing agent. In other cases, both the colorless reactive dye and the visualizing agent are coated on the same side of a sheet, or manufactured into the sheet. Relatedly, duplication arrangements according to the present invention can include dyes, visualizing agents, or both, that are contained in capsules that rupture upon application of the requisite amount of pressure. Various combinations of these carbonless techniques are well suited for application in the present invention. Transaction forms containing similar features are discussed in U.S. Pat. No. 4,943,554 to Macaulay, U.S. Pat. No. 4,977,131 to Macaulay, and U.S. Pat. No. 5,047,384 to McCormick, the disclosures of which are herein incorporated by reference.

When pressure is applied via roller 250, the embossed cardholder name characters 244 and account number characters 242, in cooperation with the carbonless duplication arrangement, cause images to form on accepter slip 210, cardholder slip 230, and issuer slip 260 due to activation of the carbonless duplication elements. In some embodiments, such duplication arrangements are configured to provide secure cardholders slips.

For example, the duplication arrangement can be adapted to produce a complete image of cardholder account number 242 onto cardholder slip 230 at locations 232a and 232b. Cardholder slip 230 can include a camouflage medium at location 232a where selected digits of the account number 242 are produced on the slip. The camouflage medium, which may be a black box or other pattern, effectively makes it difficult or impossible to read the characters formed by the activated carbonless medium. The remaining digits of the account number 242 can be seen at location 232*b* of cardholder slip 230. Thus, only a partial image of cardholder account number 242 is produced on cardholder slip 230, at location 232*b*.

In some embodiments, cardholders slip 230 can include a removable strip at location 232*a*, wherein the removable strip includes the carbonless duplication elements of the duplication arrangement. When an image of cardholder account number 242 is produced on cardholder slip 230 at locations 232*a* and 232*b*, the merchant, for example, can remove the strip from location 232*a*. Thus, only a partial image of cardholder account number 242 is produced on cardholder slip 230, at location 232*b*. In some embodiments, cardholder slip 230 may include a perforated boundary defining location 232*a*, such that removal of the strip, which may be integral with slip 230, results in an aperture in slip 230 at location 232*a*.

System 200 may include a suppression element, which prevents the formation of visible indicia at location 232*a* of cardholder slip 230. For example, a neutralizing agent may be incorporated into slip 230 at location 232*a* which prevents the activation of or otherwise renders inert certain carbonless duplication elements. Relatedly, one or more of the carbonless duplication elements may be absent from location 232*a* of slip 230. When pressure is applied to location 232*a*, an image of cardholder account number 242 is not formed there because the carbonless duplication medium is not fully activated. Thus, when card 240 and system 200 are processed in a manual imprinter only a partial image of cardholder account number 242 is produced on cardholder slip 230, at location 232*b*.

In related embodiments where cardholder slip 230 is above accepter slip 210, a suppression element of duplication arrangement can include a rigid shield at location 232*a*, on back side of cardholder slip 230*b*. When system 200 is processed in a manual imprinter, indentations from the corresponding portion of cardholder account number 242 of card 240 cannot pass through the shield, and therefore there is no activation of carbonless duplication elements in location 232*a*. Thus, only a partial image of cardholder account number 242 is produced on cardholder slip 230, at location 232*b*.

The present invention also includes methods for making transaction systems such as those described herein. For example, in one embodiment, a method for making a transaction system may include attaching an accepter slip with a cardholder slip and an issuer slip or a separate duplication arrangement using a suitable adhesive. It is appreciated that these elements can be bonded together in a variety of ways, including crimping, heat sealing, and the like.

While the above provides a full and complete disclosure of certain embodiments of the present invention, various modifications, alternate constructions and equivalents may be employed as desired. Therefore, the above description and illustrations should not be construed as limiting the invention, which is defined by the appended claims.

What is claimed is:

1. A transaction form system comprising: a cardholder slip usable by a cardholder; an accepter slip usable by an accepter; and a duplication arrangement configured to produce a complete image of a card identifier onto the accepter slip, wherein the duplication arrangement or the cardholder slip comprises a removable strip configured for alignment with part of the card identifier, such that, when the duplication arrangement comprises the removable strip, upon removal of the strip the duplication arrangement is configured to produce both a partial image of the card identifier onto the cardholder slip and the complete image of the card identifier onto the accepter slip, or such that, when the cardholder slip comprises the removable strip, subsequent to producing the complete image of the card identifier on the accepter slip and removal of the strip from the cardholder slip, a portion of the complete image of the card identifier is present on the cardholder slip.

2. The system of claim 1, wherein the card identifier comprises a 16 digit cardholder account number, and the complete image of the presentation instrument identifier comprises the 16 digit cardholder account number.

3. The system of claim 1, wherein the card identifier comprises a 16 digit cardholder account number, and the partial image of the presentation instrument consists of less than 16 digits of the 16 digit cardholder account number.

4. The system of claim 1, wherein the card identifier comprises a 16 digit cardholder account number, and the partial image of the presentation instrument consists of the first 12 digits of the 16 digit cardholder account number.

5. The system of claim 1, wherein the card identifier comprises embossed characters.

6. The system of claim 1, further comprising an issuer slip, wherein the duplication arrangement is configured to produce a complete image of the card identifier onto the issuer slip.

7. The system of claim 1, wherein the duplication arrangement comprises the removable strip.

8. The system of claim 1, wherein the cardholder slip comprises the removable strip.

9. A method of processing a card during a transaction, the method comprising: accepting a card from a cardholder; placing the card in an imprinter along with a transaction form, the transaction form including an accepter slip usable by an accepter, a cardholder slip usable by the cardholder, and a duplication arrangement, wherein the cardholder slip or the duplication arrangement comprises a removable trip configured for alignment with part of the card identifier; and when the cardholder slip comprises the removable strip, processing the card against the transaction form with the imprinter to produce a complete image of a card identifier onto the accepter slip and a portion of the image of the card identifier onto the removable strip of the cardholder slip, such that removal of the strip from the cardholder slip results in an incomplete image of the card identifier to be present on the cardholder slip; and when the duplication arrangement comprises the removable strip, subsequent to removing the strip, processing the card identifier against the transaction form with the imprinter to produce the complete image of a card identifier onto the accepter slip and a partial image of the card identifier onto the cardholder slip.

10. The method of claim 9, wherein the card identifier comprises a 16 digit cardholder account number, and the complete image of the presentation instrument identifier comprises the 16 digit cardholder account number.

11. The method of claim 9, wherein the card identifier comprises a 16 digit cardholder account number, and the partial image of the presentation instrument consists of less than 16 digits of the 16 digit cardholder account number.

12. The method of claim 9, wherein the card identifier comprises a 16 digit cardholder account number, and the partial image of the presentation instrument consists of the first 12 digits of the 16 digit cardholder account number.

13. The method of claim 9, wherein the card identifier comprises embossed characters.

14. The method of claim 9, wherein the transaction form comprises an issuer slip, and the processing step comprises producing a complete image of the card identifier onto the issuer slip.

15. The method of claim 9, wherein the duplication arrangement comprises the removable strip.

16. The method of claim 9, wherein the cardholder slip comprises the removable strip.

17. A method of making a transaction form system, comprising attaching a cardholder slip usable by a cardholder with an accepter slip usable by an accepter and a duplication arrangement, wherein the cardholder slip or the duplication arrangement comprises a removable strip and the duplication arrangement is configured to produce a complete image of a card identifier onto the accepter slip, wherein when the duplication arrangement comprises the removable strip, the duplication arrangement produces a partial image of the card identifier onto the cardholder slip when the strip is removed prior to producing the complete image of the card identifier onto the accepter slip, and wherein when the cardholder slip comprises the removable strip, subsequent to producing the complete image of the card identifier onto the accepter slip and removal of the strip from the cardholder slip, a portion of the complete image of the card identifier is present on the cardholder slip.

18. The method of claim 17, wherein the duplication arrangement comprises the removable strip.

19. The method of claim 17, wherein the cardholder slip comprises the removable strip.

20. A transaction form system comprising:
   a cardholder slip usable by cardholder;
   an accepter slip usable by accepter;
   a duplication arrangement configured to produce a complete image of a card identifier onto the accepter slip; and
   a rigid blocking member that cannot be deformed when the system is processed in the imprinter with a presentation instrument;
   wherein the rigid blocking member is configured for alignment with part of the presentation instrument identifier, such that when the system is processed in an imprinter a partial image of the presentation instrument identifier is produced on the cardholder slip.

\* \* \* \* \*